United States Patent
Cheng et al.

(10) Patent No.: US 8,530,912 B2
(45) Date of Patent: Sep. 10, 2013

(54) PIXEL STRUCTURE AND MANUFACTURING METHOD THEREOF

(75) Inventors: Tsung-Chin Cheng, Kaohsiung (TW); Zeng-De Chen, Yunlin County (TW); Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 246 days.

(21) Appl. No.: 13/094,841

(22) Filed: Apr. 27, 2011

(65) Prior Publication Data
US 2011/0309397 A1   Dec. 22, 2011

(30) Foreign Application Priority Data
Jun. 22, 2010  (TW) .................................. 99120280 A

(51) Int. Cl.
*H01L 33/00*  (2010.01)
(52) U.S. Cl.
USPC ............... 257/89; 257/59; 257/72; 257/88; 257/98; 257/E33.071; 438/29; 349/43; 349/44; 349/106; 349/111
(58) Field of Classification Search
USPC .............. 257/59, 72, 88, 89, 98, E33.071; 438/29; 349/43, 44, 106, 111
See application file for complete search history.

(56) References Cited

U.S. PATENT DOCUMENTS

| | | | |
|---|---|---|---|
| 5,777,707 A | 7/1998 | Masaki et al. | |
| 6,674,495 B1* | 1/2004 | Hong et al. | 349/43 |
| 6,888,588 B2* | 5/2005 | Luo | 349/44 |
| 7,323,371 B2 | 1/2008 | Yang et al. | |
| 2008/0151162 A1* | 6/2008 | Lee et al. | 349/116 |
| 2009/0174835 A1 | 7/2009 | Lee et al. | |
| 2010/0330713 A1* | 12/2010 | Lee et al. | 438/24 |
| 2012/0021548 A1* | 1/2012 | Yamazaki et al. | 438/46 |

FOREIGN PATENT DOCUMENTS

| | | |
|---|---|---|
| CN | 1097207 C | 12/2002 |
| CN | 1201205 C | 5/2005 |
| CN | 101149546 A | 3/2008 |

OTHER PUBLICATIONS

"First Office Action of China Counterpart Application", issued on May 24, 2011, p. 1-p. 12.

* cited by examiner

*Primary Examiner* — Victor A Mandala
(74) *Attorney, Agent, or Firm* — Jianq Chyun IP Office

(57) ABSTRACT

A pixel structure including a substrate, a color filter layer, a conductive light-shielding layer, a buffer layer, a scan line, a data line, an active device, and a pixel electrode is provided. The substrate has a pixel region. The color filter layer is disposed corresponding to the pixel region. The conductive light-shielding layer is disposed corresponding to the periphery of the pixel region. The buffer layer covers the conductive light-shielding layer and color filter layer. The scan line and the data line are disposed on the buffer layer. The active device is disposed on the buffer layer and electrically connected to the scan line and data line. The pixel electrode is disposed on the buffer layer and electrically connected to the active device, wherein an overlapping area between the pixel electrode and the conductive light-shielding layer constitutes a storage capacitor. A method for manufacturing the pixel structure is also provided.

12 Claims, 14 Drawing Sheets

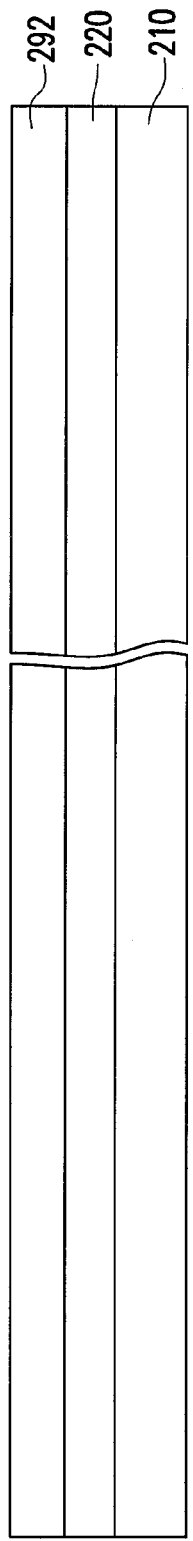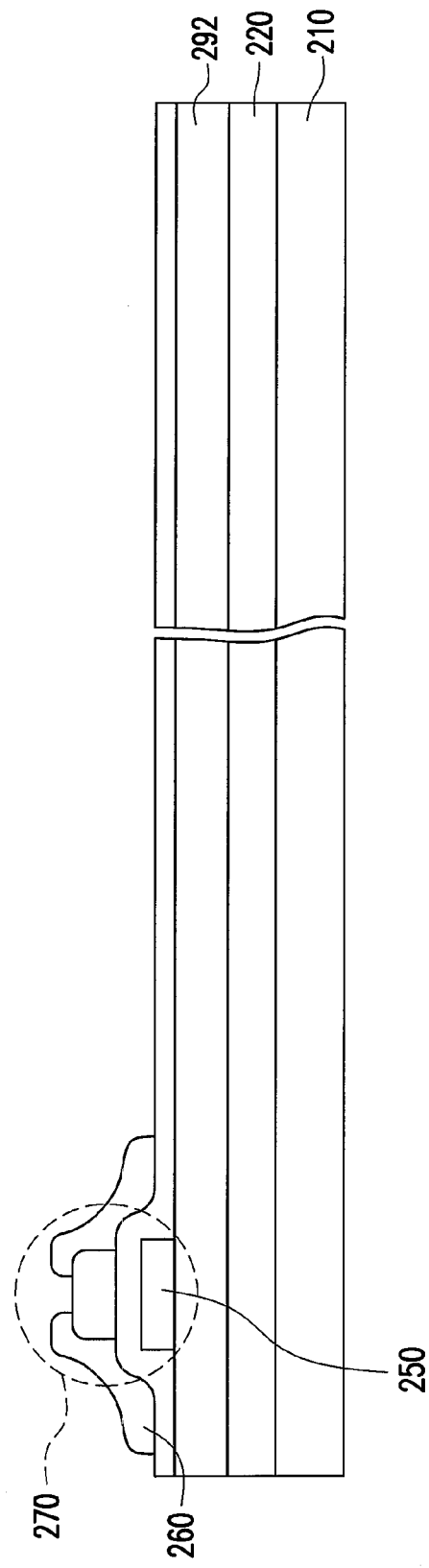

PIXEL STRUCTURE AND MANUFACTURING METHOD THEREOF

CROSS-REFERENCE TO RELATED APPLICATION

This application claims the priority benefit of Taiwan application serial no. 99120280, filed Jun. 22, 2010. The entirety of the above-mentioned patent application is hereby incorporated by reference herein and made a part of this specification.

BACKGROUND OF THE INVENTION

1. Field of the Invention

The present invention generally relates to a structure and a manufacturing method thereof, and more particularly, to a pixel structure and a manufacturing method thereof.

2. Description of Related Art

The sizes of video or image devices have been reduced along with the improvement in computer performance and the development of the Internet and multimedia technologies. Regarding the development of displays, liquid crystal display (LCD) has become the mainstream product in today's display market along with the advancement of photovoltaic and semiconductor manufacturing techniques thanks to its many advantages, such as high image quality, high space efficiency, low power consumption, and no radiation.

In recent years, an "array on color filter (AOC)" and a LCD panel with two opposite substrates and a common electrode have been provided along with the development of display panels. Generally speaking, an AOC substrate includes a color filter layer and a conventional active device array layer, wherein the active device array layer is usually disposed above the color filter layer.

However, a storage capacitor is usually formed on an AOC substrate by using the pixel electrode and a common electrode. Since the common electrode takes up space within the pixel region, the aperture ratio cannot be effectively improved when the AOC substrate is applied to a display panel.

SUMMARY OF THE INVENTION

Accordingly, the present invention is directed to a pixel structure with an improved aperture ratio.

The present invention is also directed to a method for manufacturing aforementioned pixel structure.

The present invention provides a pixel structure including a substrate, a color filter layer, a conductive light-shielding layer, a buffer layer, a scan line, a data line, an active device, and a pixel electrode. The substrate has a pixel region. The color filter layer is disposed corresponding to the pixel region of the substrate. The conductive light-shielding layer is disposed corresponding to the periphery of the pixel region. The buffer layer covers the conductive light-shielding layer and the color filter layer. The scan line and the data line are disposed above the buffer layer. The active device is disposed above the buffer layer and electrically connected to the scan line and the data line. The pixel electrode is disposed above the buffer layer and electrically connected to the active device, wherein an overlapping area between the pixel electrode and the conductive light-shielding layer constitutes a storage capacitor.

The present invention provides a pixel structure including a substrate, a color filter layer, a scan line, a data line, an active device, a pixel electrode, a buffer layer, and a conductive light-shielding layer. The substrate has a pixel region. The color filter layer is disposed above the substrate and corresponding to the pixel region. The scan line and the data line are disposed above the color filter layer. The active device is disposed above the color filter layer and electrically connected to the scan line and the data line. The pixel electrode is disposed above the color filter layer and electrically connected to the active device. The buffer layer covers the pixel electrode. The conductive light-shielding layer is disposed above the buffer layer and corresponding to the periphery of the pixel region. An overlapping area between the pixel electrode and the conductive light-shielding layer constitutes a storage capacitor.

The present invention provides a method for manufacturing a pixel array. The method includes following steps. First, a substrate having a plurality of pixel regions is provided. Then, a color filter layer corresponding to the pixel regions is formed above the substrate. Next, a conductive light-shielding layer is formed at the peripheries of the pixel regions. After that, a buffer layer is formed above the substrate to cover the conductive light-shielding layer and the color filter layer. Next, a plurality of scan lines, a plurality of data lines, and a plurality of active devices electrically connected to the scan lines and the data lines are formed above the buffer layer. After that, a plurality of pixel electrodes is formed above the buffer layer, wherein each of the pixel electrodes is electrically connected to one of the active devices, and an overlapping area between each of the pixel electrodes and the conductive light-shielding layer constitutes a storage capacitor.

The present invention provides a method for manufacturing a pixel array. The method includes following steps. First, a substrate having a plurality of pixel regions is provided. Then, a color filter layer corresponding to the pixel regions is formed above the substrate. Next, a plurality of scan lines, a plurality of data lines, and a plurality of active devices electrically connected to the scan lines and the data lines are formed above the color filter layer. Next, a plurality of pixel electrodes is formed above the color filter layer, wherein each of the pixel electrodes is electrically connected to one of the active devices. After that, a buffer layer is formed to cover the active devices and the pixel electrodes. Next, a conductive light-shielding layer is formed at the peripheries of the pixel regions above the buffer layer, wherein an overlapping area between each of the pixel electrodes and the conductive light-shielding layer constitutes a storage capacitor.

The present invention provides a pixel structure including a substrate, a color filter layer, a scan line, a data line, an active device, a buffer layer, a conductive light-shielding layer, a planarization layer, and a pixel electrode. The substrate has a pixel region. The color filter layer is disposed above the substrate and corresponding to the pixel region. The scan line and the data line are disposed above the color filter layer. The active device is disposed above the color filter layer and electrically connected to the scan line and the data line. The buffer layer covers the active device. The conductive light-shielding layer is disposed above the buffer layer and corresponding to the periphery of the pixel region. The planarization layer covers the conductive light-shielding layer. The pixel electrode is disposed above the planarization layer and above the color filter layer, and the pixel electrode is electrically connected to the active device. An overlapping area between the pixel electrode and the conductive light-shielding layer constitutes a storage capacitor.

The present invention provides a method for manufacturing a pixel array. The method includes following steps. First, a substrate having a plurality of pixel regions is provided. Then, a color filter layer corresponding to the pixel regions is formed above the substrate. Next, a plurality of scan lines, a plurality of data lines, and a plurality of active devices electrically connected to the scan lines and the data lines are formed above the color filter layer. After that, a buffer layer is formed to cover the active devices. Next, a conductive light-shielding layer is formed at the peripheries of the pixel regions above the buffer layer. Thereafter, a planarization layer is formed to cover the conductive light-shielding layer. Then, a plurality of pixel electrodes is formed above the planarization layer and also above the color filter layer, wherein each of the pixel electrodes is electrically connected to one of the active devices, and an overlapping area between each of the pixel electrodes and the conductive light-shielding layer constitutes a storage capacitor.

As described above, in a pixel structure provided by the present invention, a conductive light-shielding layer is disposed at the periphery of a pixel region, and an overlapping area between a pixel electrode and the conductive light-shielding layer constitutes a storage capacitor of the pixel structure. Namely, besides being served as a black matrix as in the conventional display technique, the conductive light-shielding layer is also served as a storage capacitor by partially overlapping it with the pixel electrode. Thus, the aperture ratio of the pixel structure is improved by replacing the conventional design having a common electrode as a storage capacitor. The present invention also provides a method for manufacturing foregoing pixel structure and pixel array.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6A-6E are cross-sectional views illustrating a manufacturing process of the pixel structure in FIG. 5.

DESCRIPTION OF THE EMBODIMENTS

Figure 1:
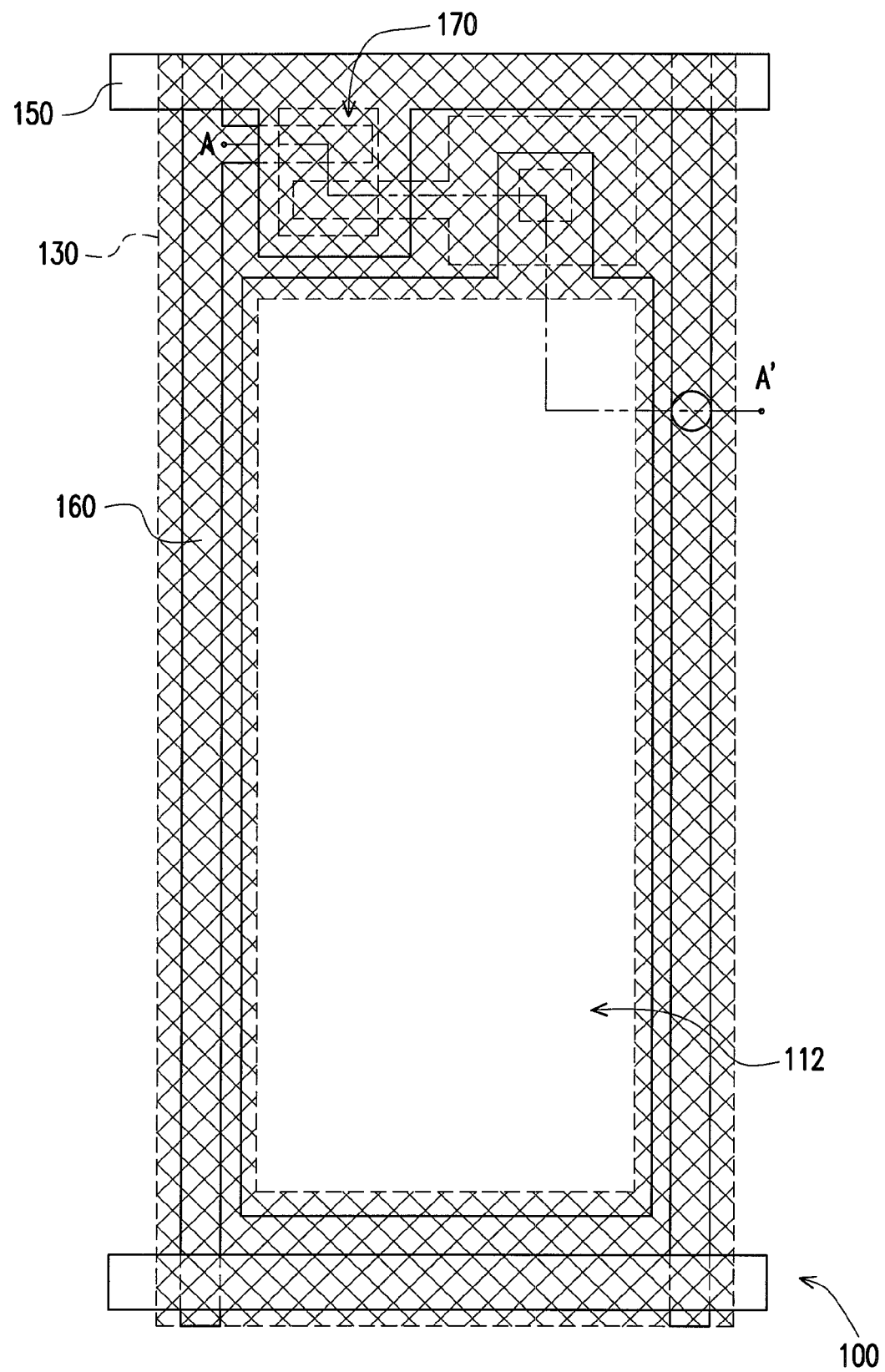
FIG. 1 is a partial top view of a pixel structure in a pixel array according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
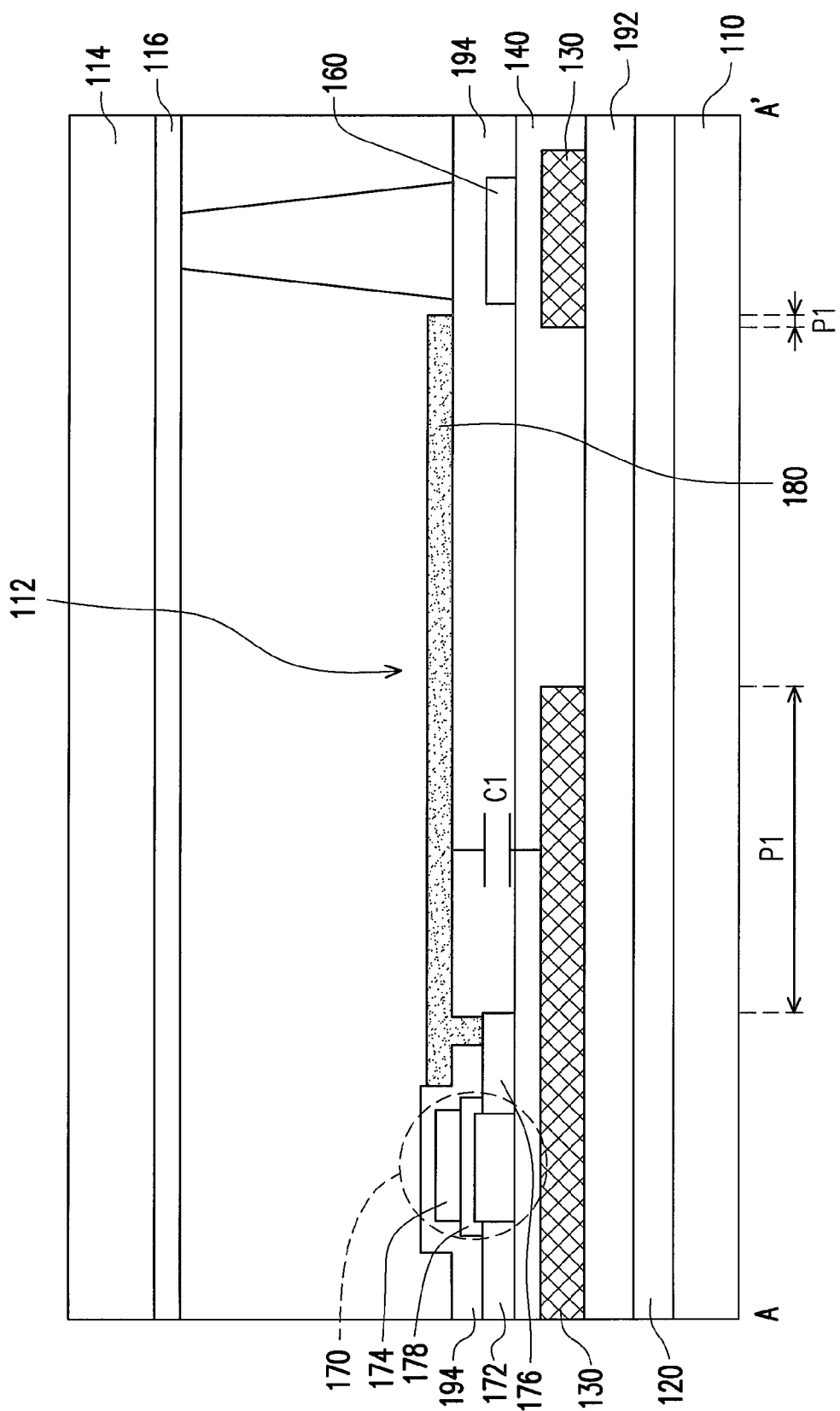
FIG. 2 is a cross-sectional view of the pixel structure in FIG. 1 along line AA'.

FIG. 1 is a partial top view of a pixel structure in a pixel array according to an embodiment of the present invention, and FIG. 2 is a cross-sectional view of the pixel structure in FIG. 1 along line AA'. Referring to both FIG. 1 and FIG. 2, in the present embodiment, the pixel structure 100 includes a substrate 110, a color filter layer 120, a conductive light-shielding layer 130, a buffer layer 140, a scan line 150, a data line 160, an active device 170, and a pixel electrode 180. The substrate 110 has a pixel region 112, and the color filter layer 120 is corresponding to the pixel region 112 of the substrate 110. In the present embodiment, the substrate 110 may be a glass substrate or other types of transmissive substrates. Besides, the color filter layer 120 in the present embodiment may be formed by arranging red filter layers, green filter layers, and blue filter layers alternatively or as an array according to the actual design requirement. In addition, the color of the color filter layer 120 is not limited to red, green, or blue, and which may also be a color obtained by mixing foregoing three colors.

The conductive light-shielding layer 130 is corresponding to the periphery of the pixel region 112 of the substrate 110, as shown in FIG. 1 and FIG. 2. However, the structure of the conductive light-shielding layer 130 is not limited to the mesh black matrix but may also be a grid or other structures according to the actual design requirement. In the present embodiment, the relative position between the conductive light-shielding layer 130 and the pixel region 112 may be the same as the typical relative position between a black matrix and a color filter layer. For example, assuming that the color filter layer 120 of a corresponding pixel array is arranged as a red filter layer, a green filter layer, and a blue filter layer, the conductive light-shielding layer may be disposed between these color filter layers so that the overall arrangement may be the red filter layer, the conductive light-shielding layer, the green filter layer, the conductive light-shielding layer, and the blue filter layer from left to right. In other words, herein the periphery refers to that the conductive light-shielding layer 130 surrounds each color filter layer 120, as shown in FIG. 1. However, the present invention is not limited thereto.

In the present embodiment, the pixel structure 100 may further include a planarization layer 192 disposed between the color filter layer 120 and the conductive light-shielding layer 130, as shown in FIG. 2. The planarization layer 192 may be made of an insulating material, a dielectric material, an organic material, or an inorganic material. Besides maintaining a flat surface, the planarization layer 192 also prevents the conductive light-shielding layer 130 and the color filter layer 120 from contaminating each other. Additionally, in the present embodiment, the color filter layer 120 is disposed on the substrate 110, and the conductive light-shielding layer 130 is disposed above the color filter layer 120, as shown in FIG. 2.

Referring to FIG. 1 and FIG. 2 again, the buffer layer 140 covers the conductive light-shielding layer 130 and the color filter layer 120. Herein the term "cover" refers to that one is directly on or above the other. For example, the buffer layer 140 covering the color filter layer 120 means that the buffer layer 140 is on the color filter layer 120. The term "cover" will have the same meaning thereinafter. In the present embodiment, the buffer layer 140 may be made of an insulating material, a dielectric material, an organic material, or an inorganic material (for example, silicon oxide or silicon nitride) such that when subsequently an electronic device is formed on the substrate, no electrical connection (accordingly short circuit) is established between the electronic device and the conductive light-shielding layer. Besides, the scan line 150, the data line 160, and the active device 170 are disposed on the buffer layer 140, and the active device 170 is electrically connected to the scan line 150 and the data line 160, as shown in FIG. 1 and FIG. 2. In the present embodiment, the active device 170 may be a thin film transistor (TFT), and which includes a source 172, a gate 174, and a drain 176. The source 172 is electrically connected to the data line 160, and the gate 174 is electrically connected to the scan line 150. Additionally, in the present embodiment, the active device 170 and the conductive light-shielding layer 130 at least partially overlap each other, as shown in FIG. 1 and FIG. 2.

The pixel electrode 180 is disposed above the buffer layer 140 and electrically connected to the active device 170. An overlapping area P1 between the pixel electrode 180 and the conductive light-shielding layer 130 constitutes a storage capacitor C1, as shown in FIG. 1 and FIG. 2. In the present embodiment, the pixel structure 100 further includes a passivation layer 194. The passivation layer 194 covers the active device 170 and the buffer layer 140, as shown in FIG. 2. To be specific, the passivation layer 194 and the buffer layer 140 between the pixel electrode 180 and the conductive light-shielding layer 130 are served as a capacitor dielectric layer of the storage capacitor C1. Accordingly, the pixel structure 100 can have a greater storage capacitance according to the size of the overlapped area between the conductive light-shielding layer 130 and the pixel electrode 180. Namely, besides being served as a black matrix, the conductive light-shielding layer 130 in the present embodiment is also served as a storage capacitor of the pixel structure 100 because of the conductivity thereof and the overlapping area between the conductive light-shielding layer 130 and the pixel electrode 180. Thereby, the common electrode served as a storage capacitor in the conventional technique can be omitted, and the aperture ratio of the pixel structure 100 in the present embodiment is improved.

In the present embodiment, the pixel electrode 180 may be made of a transmissive conductive material, and the active device 170 determines whether an electronic signal on the data line 160 can sequentially pass through the source 172 and the drain 176 to reach the pixel electrode 180 and charge the storage capacitor C1 by controlling the voltage supplied to the gate 174. Herein the operations of the active device 170 and the pixel electrode 180 are well known to those having ordinary knowledge in the art therefore will not be described herein.

As described above, in the pixel structure 100 provided by the present embodiment, the conductive light-shielding layer 130 is disposed at the periphery of the pixel region 112, and an overlapping area P1 between the pixel electrode 180 and the conductive light-shielding layer 130 constitutes the storage capacitor C1 of the pixel structure 100. Accordingly, besides being served as a black matrix as in the conventional display technique, the conductive light-shielding layer 130 is also served as a storage capacitor when it is partially overlapped with the pixel electrode 180. Thus, the conventional design having a common electrode as the storage capacitor is replaced, and the aperture ratio of the pixel structure 100 in the present embodiment is improved. Or, the pixel structure 100 may keep the conventional design with the common electrode together with the storage capacitor C1 formed by the conductive light-shielding layer 130 and the pixel electrode 180 in the present embodiment. In this case, the pixel structure 100 in the present embodiment can have a greater storage capacitance, and accordingly a better electrical performance, compared to a conventional pixel structure.

Figure 3A:
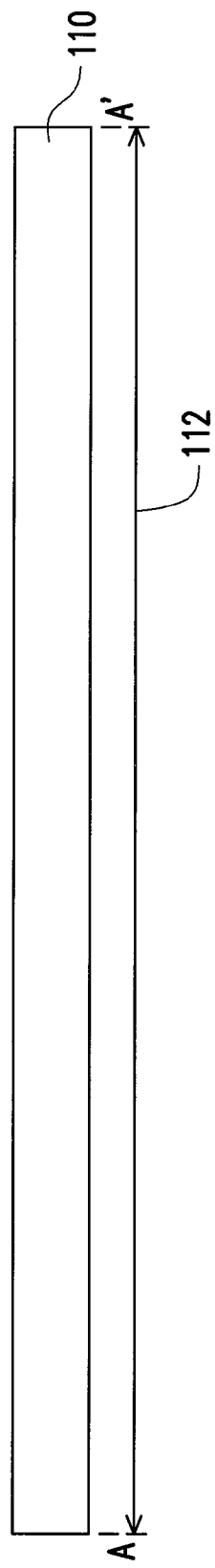
FIGS. 3A-3G are cross-sectional views illustrating how the pixel structure in FIG. 1 is manufactured along line the AA'.

FIGS. 3A-3G are cross-sectional views illustrating how the pixel structure in FIG. 1 is manufactured along line the AA'. Referring to FIG. 3A, first, the substrate 110 is provided. The substrate 110 has a plurality of pixel regions 112. The material of the substrate 110 can be referred to foregoing description.

Figure 3B:
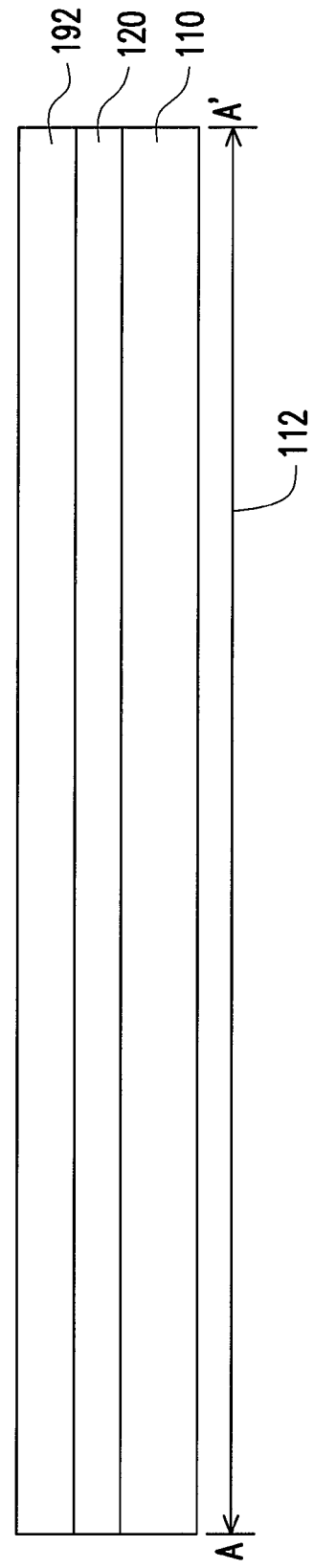

Then, the color filter layer 120 is formed on the substrate 110, wherein the color filter layer 120 is corresponding to the pixel regions 112, as shown in FIG. 3B. In the present embodiment, the color arrangement of the color filter layer 120 can be referred to foregoing description therefore will not be described herein. In addition, the color filter layer 120 may be formed by sequentially or simultaneously spraying different colors (for example, red, green, and blue, etc) of dyes into the corresponding pixel regions 112 with an inkjet nozzle or by defining different colors (for example, red, green, and blue, etc) of color resistors through a lithography process. Besides, after forming the color filter layer 112, the dyes are sequentially or simultaneously solidified to allow the solvent in the color filter layer 112 to evaporate. It should be noted that the technique for forming the color filter layer 120 described above is only an example but not intended to limit the present invention.

Next, the planarization layer 192 is selectively formed on the color filter layer 120 to cover the color filter layer 120, as shown in FIG. 3B. In another embodiment, subsequent steps illustrated in FIG. 3C may be directly executed without forming the planarization layer 192 on the color filter layer 120. However, the procedure described in present embodiment is only an example and is not limited to that illustrated in the drawings.

Figure 3C:
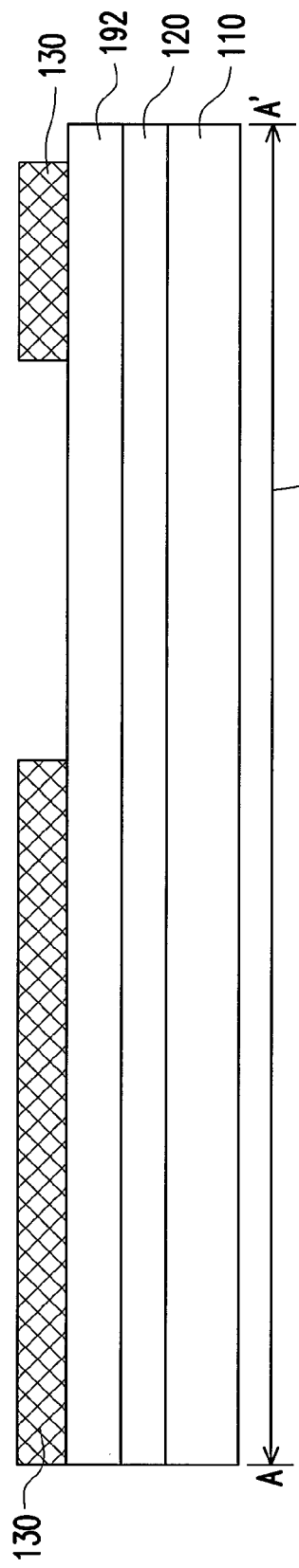

Thereafter, the conductive light-shielding layer 130 is formed at the peripheries of the pixel regions 112 on the substrate 110, as shown in FIG. 3C. In the present embodiment, the conductive light-shielding layer 130 may be made of a black or dark conductive material, such as a metal. However, the present invention is not limited thereto, and the conductive light-shielding layer 130 may be made of any conductive and light-shielding material. The conductive light-shielding layer 130 may be formed through different technique based on the material thereof. For example, the conductive light-shielding layer 130 may be formed through sputtering, evaporation, or another suitable deposition technique if it is made of a conductive light-shielding metal.

Figure 3D:
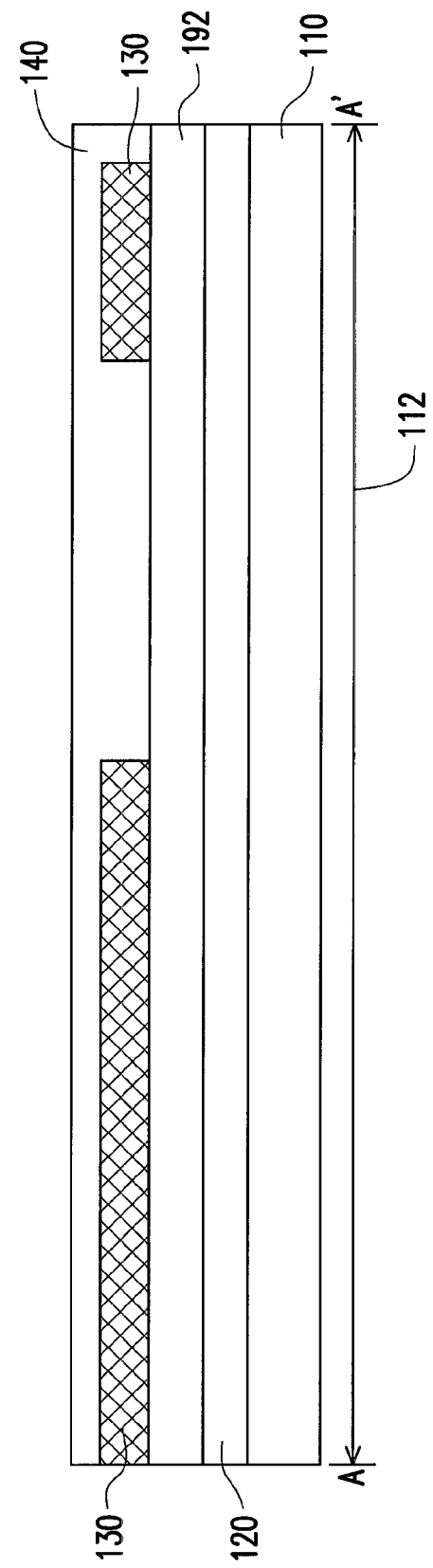

Next, the buffer layer 140 is formed on the substrate 110 to cover the conductive light-shielding layer 130 and the color filter layer 120, as shown in FIG. 3D. In the present embodiment, the material of the buffer layer 140 may be referred to foregoing description, and the buffer layer 140 may be formed through chemical vapour deposition (CVD) or another suitable technique, such as screen printing, coating, inkjet printing, or energy source processing.

Figure 3E:
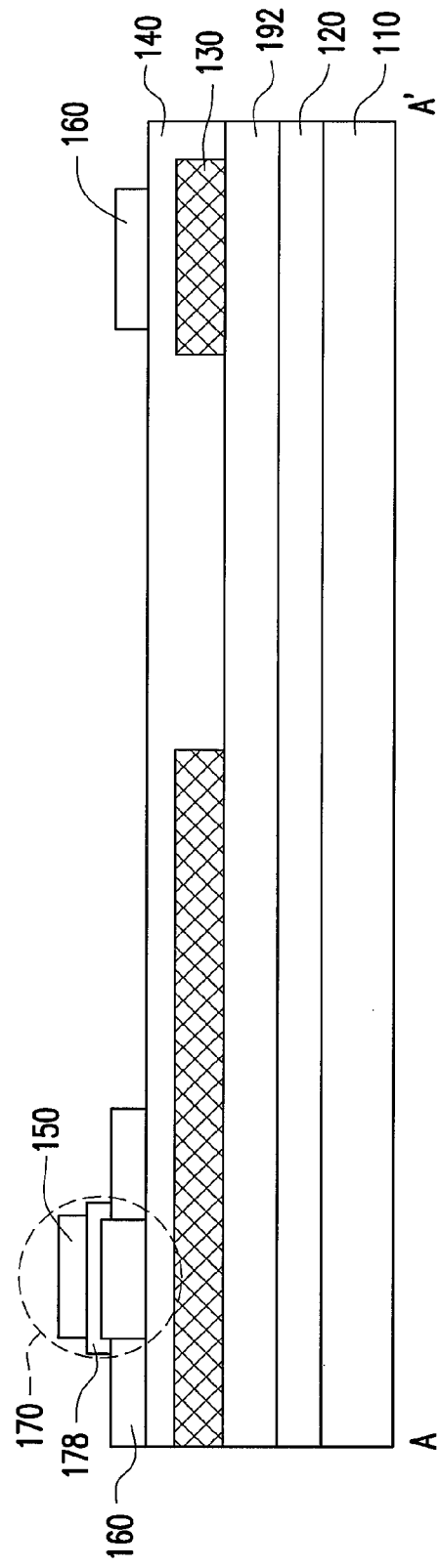
Figure 3F:
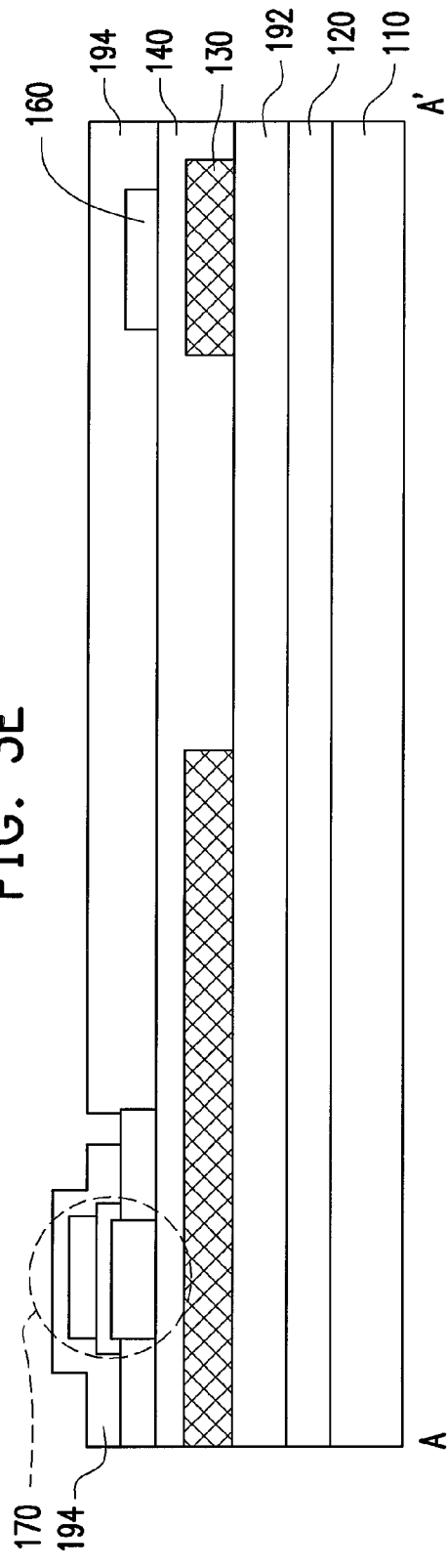

Thereafter, a plurality of scan lines 150, a plurality of data lines 160, and a plurality of active devices 170 electrically connected to the scan lines 150 and the data lines 160 are formed on the buffer layer 140, as shown in FIG. 3E. In the present embodiment, each of the active devices 170 further has a gate dielectric layer 178 besides aforementioned source 172, gate 174, and drain 176. Besides, because only one pixel structure 100 is illustrated in FIG. 3E, only one scan line 150, one data line 160, and one active device 170 can be observed. The pixel array is composed of a plurality of pixel structures 100 that are arranged as an array, wherein how the pixel structures are arranged in the pixel array is well known to those having ordinary knowledge in the art therefore will not be described herein. In addition, in the present embodiment, the active devices 170 are assumed to be top-gate TFTs. The technique for forming the top-gate TFTs is also well known to those having ordinary knowledge in the art therefore will not be described herein.

Next, the passivation layer 194 is selectively formed on the buffer layer 140 to cover the active device 170 and the buffer layer 140 before the subsequent step for forming the pixel electrodes 180 is executed. In the present embodiment, besides protecting the active devices 170, the passivation layer 194 and the buffer layer 140 between the pixel electrodes 180 and the conductive light-shielding layer 130 are also served as a capacitor dielectric layer of the storage capacitor C1.

Figure 3G:
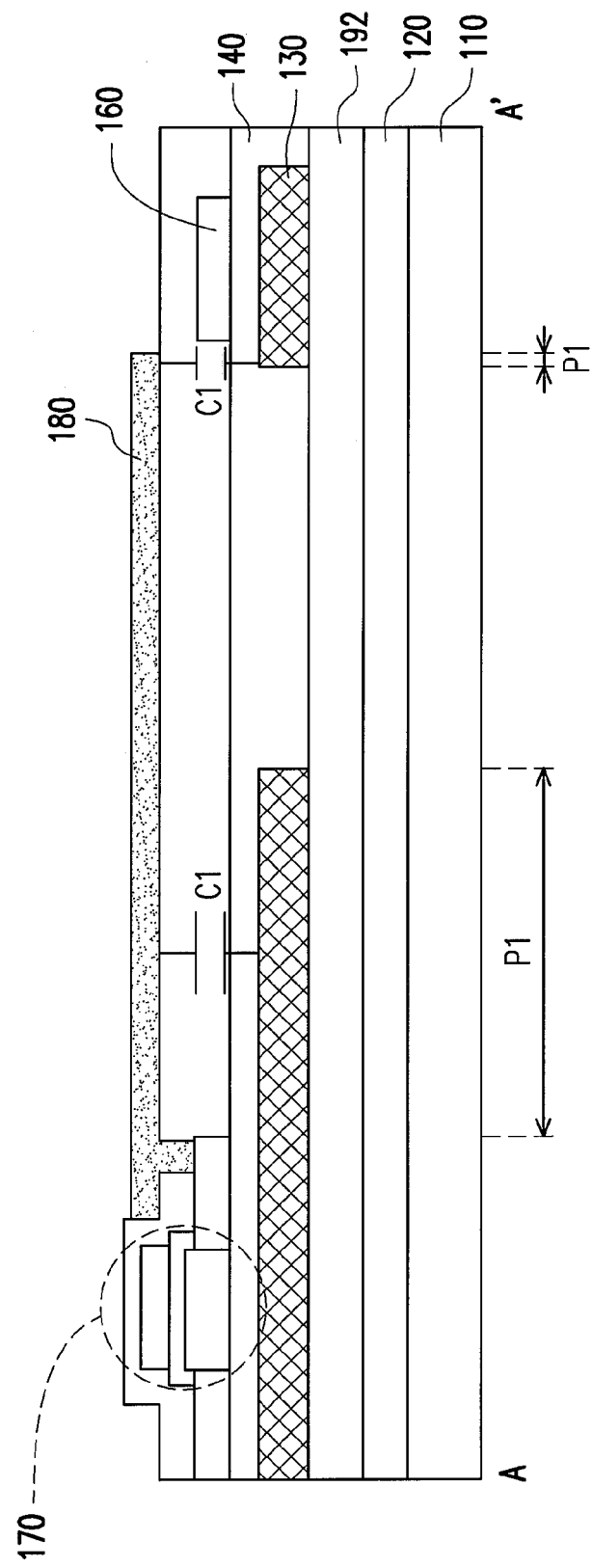

After that, a plurality of pixel electrodes 180 is formed above the buffer layer 140. Each of the pixel electrodes 180 is electrically connected to one of the active devices 170, and an overlapping area P1 between each of the pixel electrodes 180 and the conductive light-shielding layer 130 constitutes a storage capacitor C1, as shown in FIG. 3G. In the present embodiment, the pixel electrodes 180 may be formed through a photolithography process. For example, a transparent electrode material layer (not shown) is formed on the buffer layer 140, wherein the transparent electrode material layer may be formed through sputtering or evaporation. Then, the transparent electrode material layer is patterned through a photolithography process to form the pixel electrodes 180 within specific areas. However, the technique described above for forming the pixel electrodes 180 is only an example but not intended to limit the present invention, and other techniques, such as screen printing, coating, inkjet printing, and energy source processing, may also be adopted. Herein the pixel structure 100 illustrated in FIG. 2 is completed.

Figure 3H:
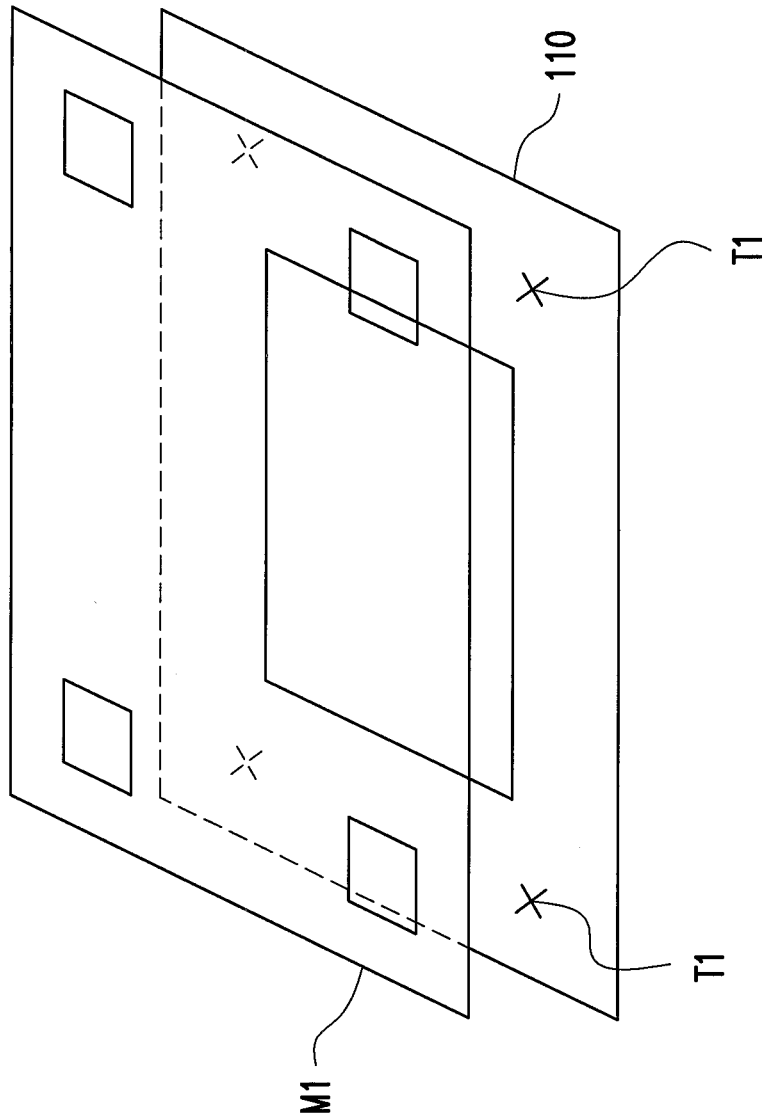
FIG. 3H is a diagram illustrating a shadow mask manufacturing process according to an embodiment.

In the present embodiment, an alignment pattern T1 is further formed at the periphery of the substrate 110 when the color filter layer 120 is formed on the substrate 110, as shown in FIG. 3H. The alignment pattern T1 is used for alignment in subsequent photolithography process. To be specific, the conductive light-shielding layer 130 is formed on the substrate 110 through following steps. First, a conductive layer (not shown) is deposited on the substrate 110 by using a shadow mask M1, wherein the conductive layer exposes the alignment pattern T1. Then, a patterning process is performed on the conductive layer to form the conductive light-shielding layer 130 as shown in FIG. 3C. It should be noted that by adopting the shadow mask, the alignment pattern is prevented from being covered by the conductive layer or becoming unclear and no alignment problem will be caused in subsequent process.

It should be mentioned that the manufacturing process of a typical color filter substrate is completed after the steps in FIGS. 3A-3B or FIGS. 3A-3C are completed. In other words, in the present embodiment, another color filter substrate may simply be formed through the manufacturing process other than an array on color filter (AOC) structure.

It should be noted that if in the present embodiment, a display panel is formed if an opposite substrate 114 is disposed opposite to the substrate 110 and a common electrode 116 is disposed on the opposite substrate 114, and a liquid crystal display (LCD) panel is formed if a liquid crystal layer is filled between the opposite substrate 114 and the substrate 110.

Figure 4A:
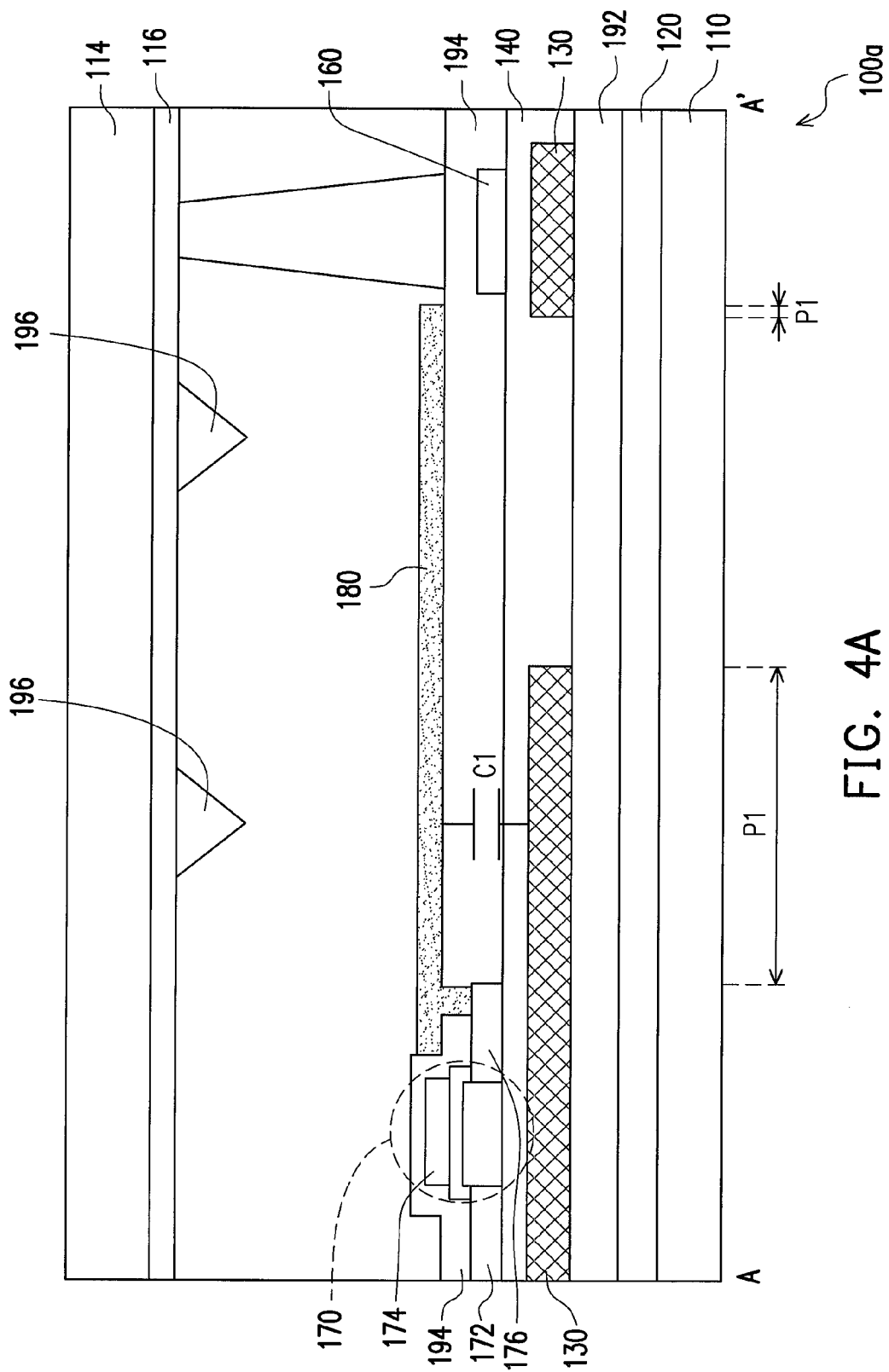
FIG. 4A and FIG. 4B are cross-sectional views respectively illustrating other possible optical structures adopted by the pixel structure in FIG. 2.
Figure 4B:
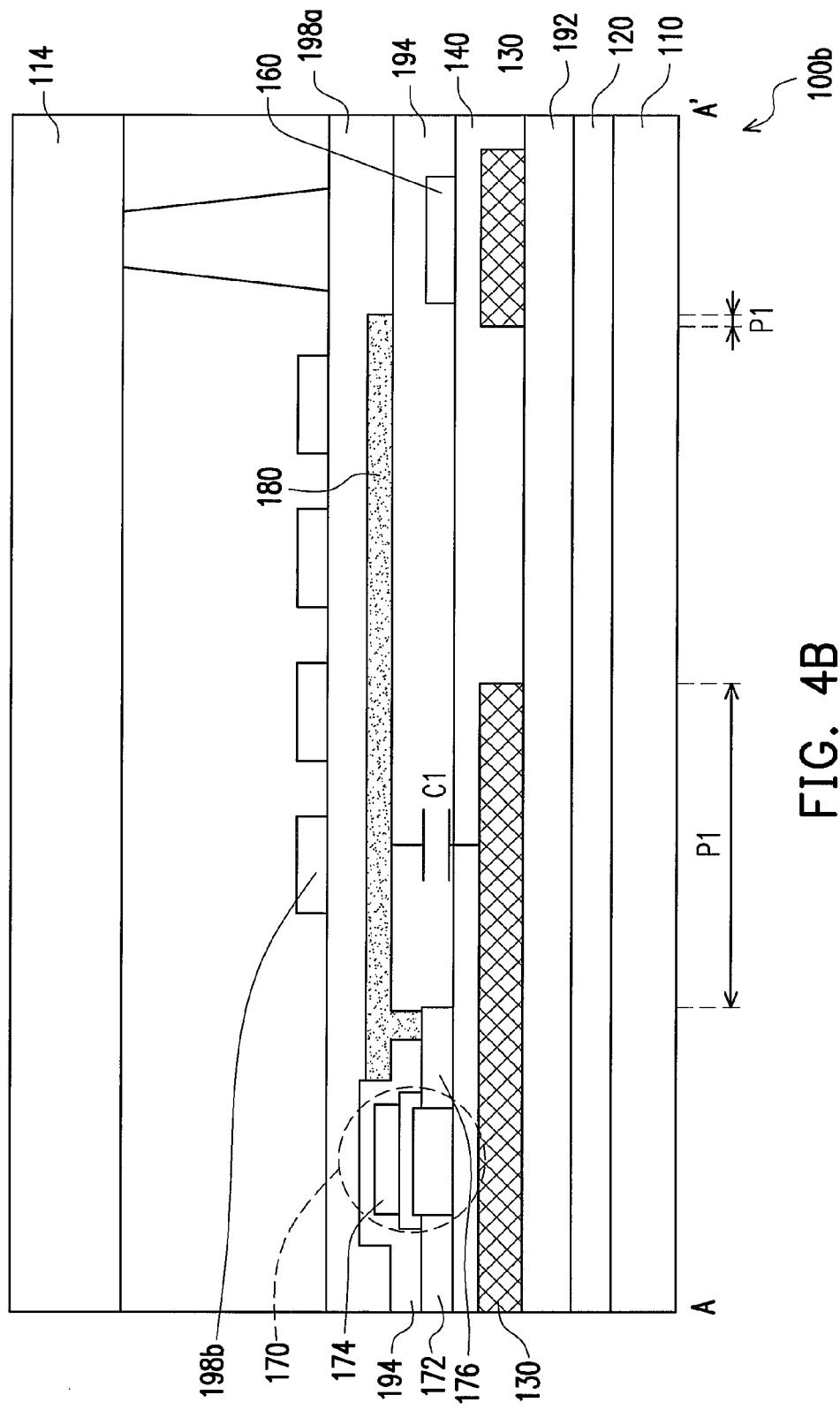

FIG. 4A and FIG. 4B are cross-sectional views respectively illustrating other possible optical structures adopted by the pixel structure in FIG. 2. For example, a vertical alignment (VA) mode design is adopted on the pixel structure 100a to achieve a higher viewing angle when the pixel structure 100a is applied to a display panel. Namely, an alignment pattern layer 196 is further formed in the pixel structure 100a, wherein the alignment pattern layer 196 is disposed on the common electrode 116 of the opposite substrate 114, as shown in FIG. 4A. In another embodiment that is not illustrated, the alignment pattern layer 196 in FIG. 4A may also be disposed on the pixel electrode 180. In yet another embodiment that is not illustrated, the alignment pattern layer 196 in FIG. 4A may also be disposed on both the pixel electrode 180 and the common electrode 116 of the opposite substrate 114. However, the present invention is not limited thereto, and the disposition of the alignment pattern layer 196 can be determined according to the actual design requirement. In addition, even though the alignment pattern layer 196 is illustrated as in a triangular shape in FIG. 4A, the present invention is not limited thereto, and the alignment pattern layer 196 may also be in a circular shape, an elliptic shape, a rectangular shape, a square shape, a strip shape, or other suitable shapes.

Moreover, besides the VA mode design, a fringe field switching (FFS) mode design may also be adopted on the pixel structure 100b so that an optimal viewing angle can be achieved when the pixel structure 100b is applied to a display panel. In other words, the pixel structure 100b may further include an insulation layer 198a and a common electrode pattern layer 198b. The insulation layer 198a covers the pixel electrode 180, and the common electrode pattern layer 198b is disposed on the insulation layer 198a, as shown in FIG. 4B.

In the pixel structures 100, 100a, and 100b described above, the active device 170 is described as a top-gate transistor, and the conductive light-shielding layer 130 is always located below the active device 170. In following embodiments, the active device 270 may be a bottom-gate transistor as shown in FIG. 5, and the conductive light-shielding layer 230 may be disposed above the active device 270.

It should be noted that because the function of the common electrode pattern layer 198b in the pixel structure 100b is similar to that of the common electrode 116 described above, a display panel is formed without disposing the common electrode 116 on the opposite substrate 114 in the pixel structure 100b. Similarly, a LCD panel is formed if a liquid crystal layer (not shown) is filled between the opposite substrate 114 and the substrate 110.

Figure 5:
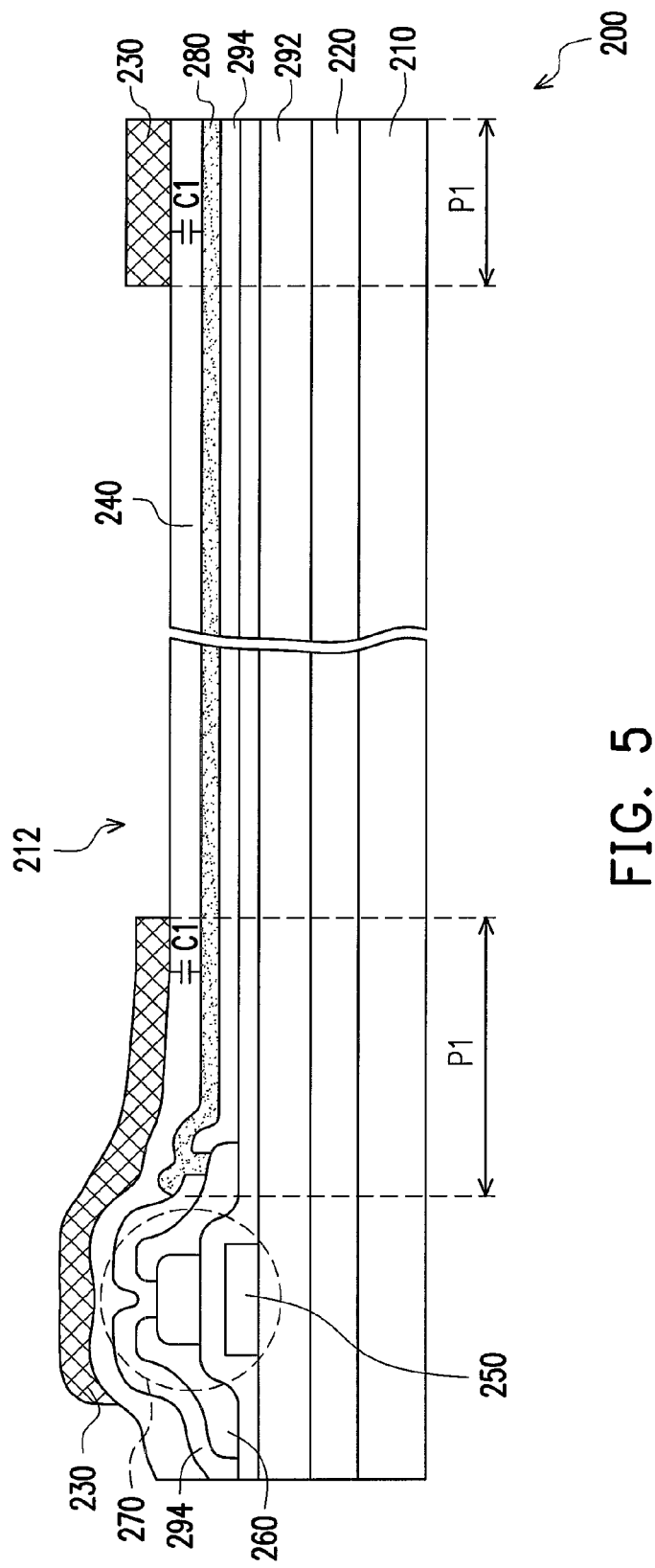
FIG. 5 is a cross-sectional view of another pixel structure along the line AA' in FIG. 1.

FIG. 5 is a cross-sectional view of a pixel structure according to another embodiment of the present invention. Referring to FIG. 5, in the present embodiment, the pixel structure 200 includes a substrate 210, a color filter layer 220, a scan line 250, a data line 260, an active device 270, a pixel electrode 280, a buffer layer 240, and a conductive light-shielding layer 230. The pixel structure 200 is similar to the pixel structure 100, and the difference between the two is that in the pixel structure 200, the active device 270 is described as a bottom-gate transistor, the conductive light-shielding layer 230 is disposed above the active device 270 and the pixel electrode 280, and the buffer layer 240 is also disposed above the pixel electrode 280. To be specific, the buffer layer 240 covers the pixel electrode 280, and the conductive light-shielding layer 230 is disposed on the buffer layer 240 and corresponding to the periphery of the pixel region 212, wherein the overlapping area P1 between the pixel electrode 280 and the conductive light-shielding layer 230 constitutes a storage capacitor C1.

In other words, besides being served as a black matrix, the conductive light-shielding layer 230 in the present embodiment can also be served as a storage capacitor of the pixel structure 200 due to the conductivity thereof and the overlapping area between the conductive light-shielding layer 230 and the pixel electrode 280. Thus, the conventional design having a common electrode as the storage capacitor is replaced, and the aperture ratio of the pixel structure 200 in the present embodiment is improved. In the present embodiment, the active device and the conductive light-shielding layer at least partially overlap each other. In the present embodiment, the pixel structure 200 may further include a planarization layer 292 for covering the color filter layer 220.

As described above, the pixel structure 200 in the present embodiment adopts the same concept as the pixel structure 100 through different structure. Thus, the pixel structure 200 has the advantages of the pixel structure 100 therefore will not be described herein.

Figure 6C:
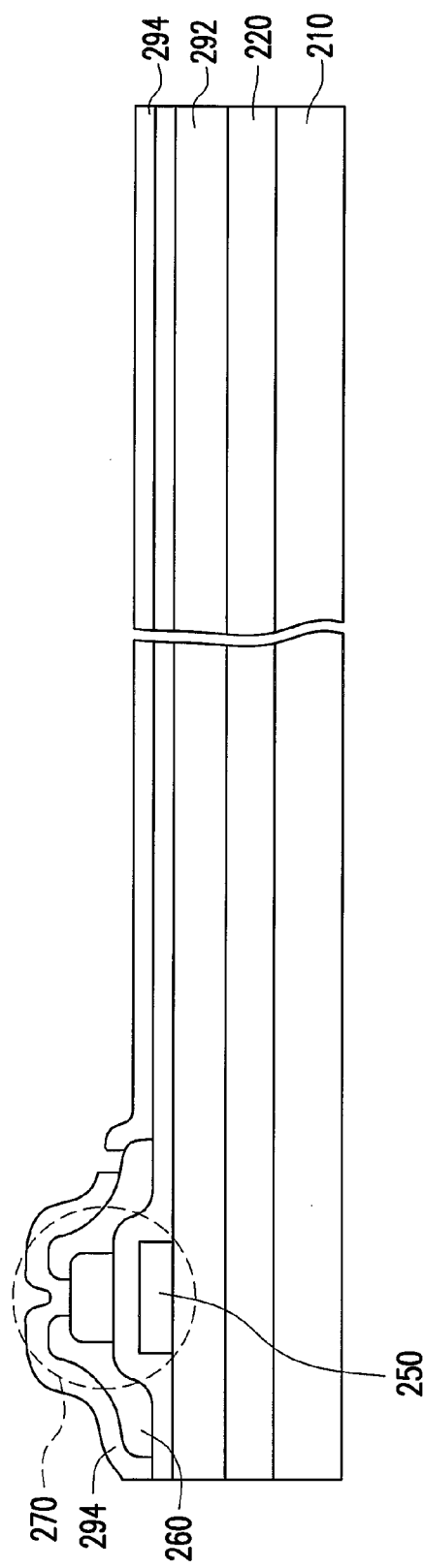

FIGS. 6A-6E are cross-sectional views illustrating a manufacturing process of the pixel structure in FIG. 5. Because the pixel structure 200 is similar to the pixel structure 100, some steps in the procedure for manufacturing the two are similar too. In other words, the structure illustrated in FIG. 6A can be completed after the steps in FIGS. 3A-3B are executed. After that, a plurality of scan lines 250, a plurality of data lines 260, and a plurality of active devices 270 electrically connected to the scan lines 250 and the data lines 260 are formed above the color filter layer 220 illustrated in FIG. 6A, as shown in FIG. 6B. In the present embodiment, the technique for forming the scan lines 250, the data lines 260, and the active devices 270 can be referred to the description related to FIG. 3E therefore will not be described herein.

Next, before executing the subsequent step for forming the pixel electrode 280, a passivation layer 294 is selectively formed on the active device 270 to cover the active device 270, as shown in FIG. 6C. In the present embodiment, the passivation layer 294 is disposed for protecting the active device 270.

Figure 6D:
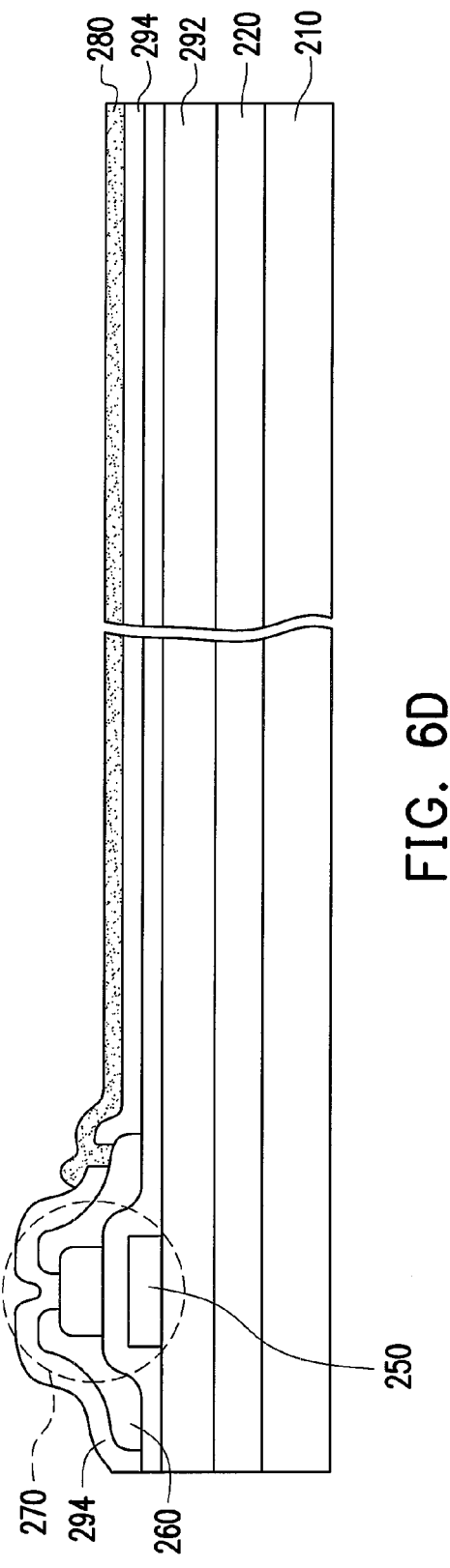

After that, a plurality of pixel electrodes 280 is formed above the color filter layer 220, wherein each of the pixel electrodes 280 is electrically connected to one of the active devices 270, as shown in FIG. 6D. The technique for forming the pixel electrodes 280 in the present embodiment is similar to that for forming the pixel electrodes 180 and can be referred to foregoing description related to FIG. 3G, therefore will not be described herein.

Figure 6E:
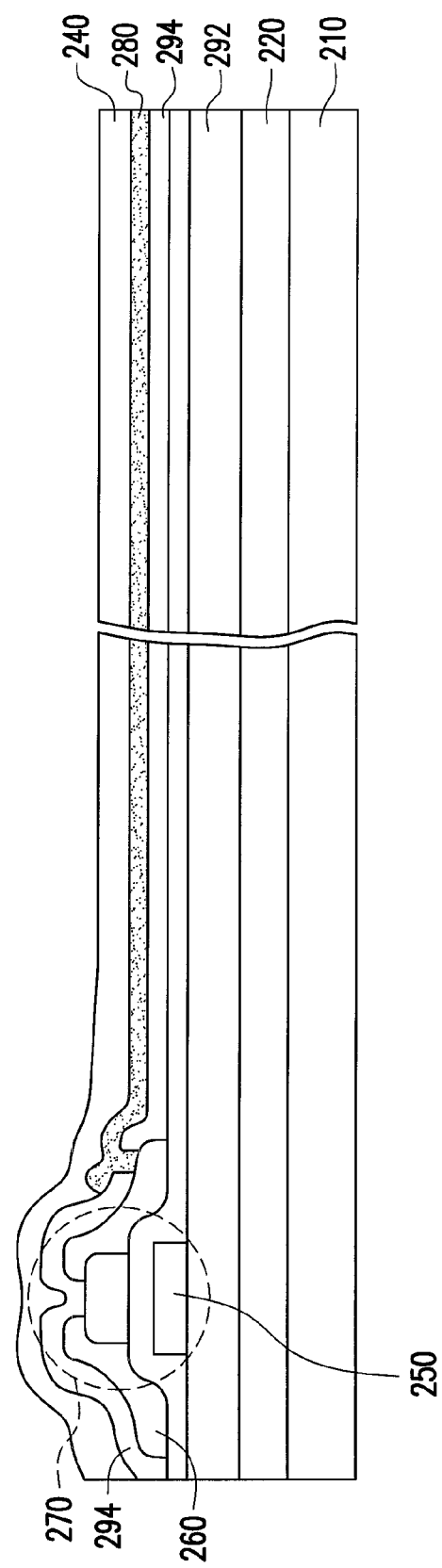

Next, a buffer layer 240 is formed to cover the active devices 270 and the pixel electrodes 280, as shown in FIG. 6E. In the present embodiment, the material of the buffer layer 240 can be referred to that of the buffer layer 140, and the buffer layer 240 may be formed through CVD or other suitable techniques, such as screen printing, coating, inkjet printing, and energy source processing.

Thereafter, a conductive light-shielding layer 230 is formed at the peripheries of the pixel regions 212 on the buffer layer 240. An overlapping area P1 between each of the pixel electrodes 280 and the conductive light-shielding layer 230 constitutes a storage capacitor C1, as shown in FIG. 5. In the present embodiment, the conductive light-shielding layer 230 may be formed on the buffer layer 240 through following steps. First, a conductive layer (not shown) is deposited on the buffer layer 240 by using a shadow mask (not shown), wherein the conductive layer exposes aforementioned alignment pattern. Then, a patterning process is performed on the conductive layer to form the conductive light-shielding layer 230, as shown in FIG. 5. Herein the pixel structure 200 illustrated in FIG. 5 is completed.

It should be mentioned that the pixel structure 200 may also adopt the design as illustrated in FIG. 4A and FIG. 4B to achieve an optimal viewing angle when the pixel structure 200 is applied to a display panel.

Figure 7:
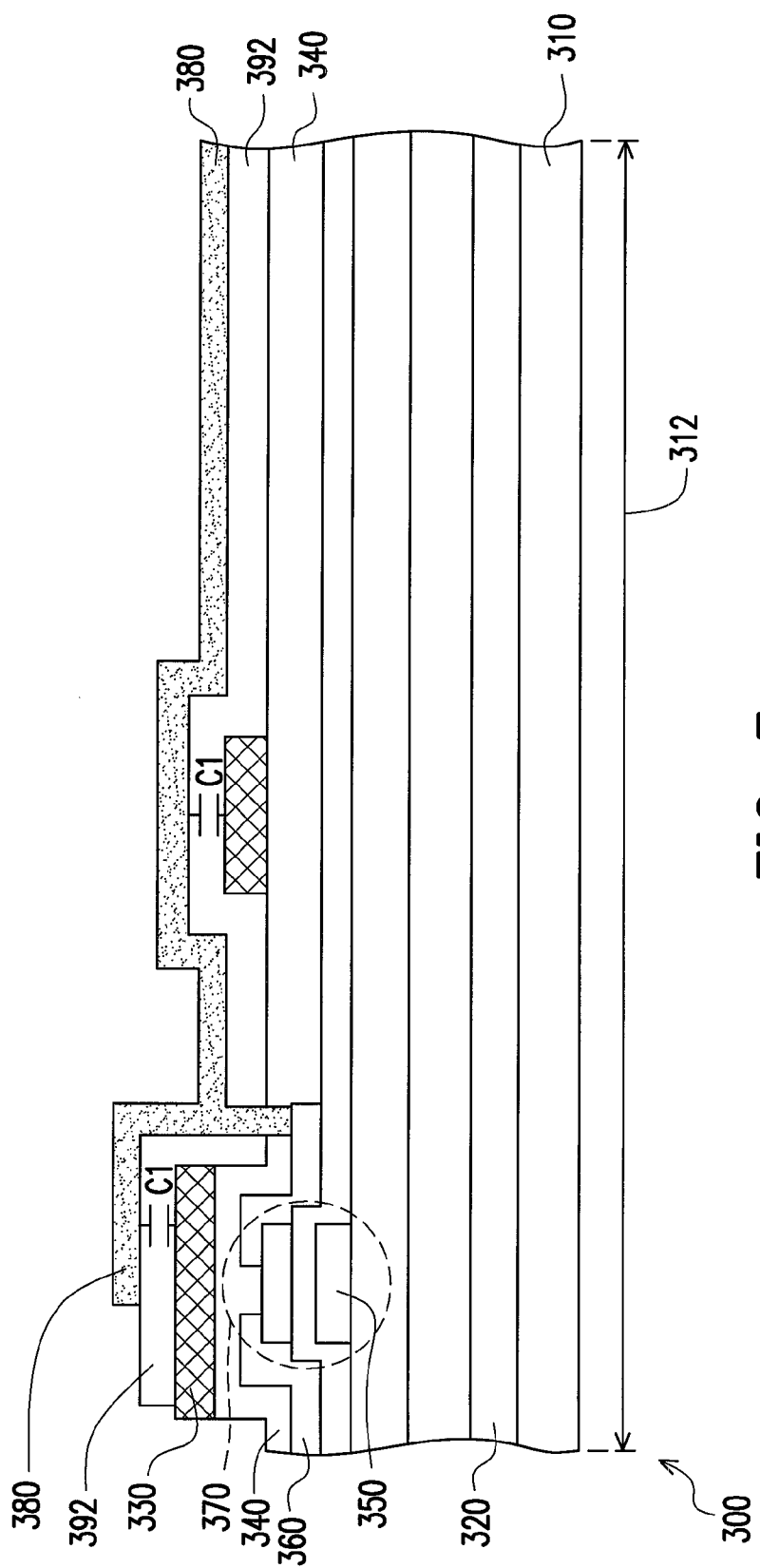
FIG. 7 is a cross-sectional view of a pixel structure according to another embodiment of the present invention.

FIG. 7 is a cross-sectional view of a pixel structure according to another embodiment of the present invention. Referring to FIG. 7, in the present embodiment, the pixel structure 300 includes a substrate 310, a color filter layer 320, a scan line 350, a data line 360, an active device 370, a buffer layer 340, a conductive light-shielding layer 330, a planarization layer 392, and a pixel electrode 380. The pixel structure 300 is also assumed to be a bottom-gate transistor, as the pixel structure 200 described above. The difference between the two pixel structures is that in the pixel structure 300, the conductive light-shielding layer 330 is formed on the substrate 310 before the pixel electrode 380. However, in the pixel structure 200, the pixel electrode 280 is formed on the substrate 210 before the conductive light-shielding layer 230. In other words, the pixel structure 300 in the present embodiment may be formed by adjusting the sequence in which the conductive light-shielding layer 230 and the pixel electrode 280 are formed in the pixel structure 200. In the present embodiment, the overlapping area between the pixel electrode 380 and the conductive light-shielding layer 330 also constitutes a storage capacitor C1. Thus, besides being served as a black matrix, the conductive light-shielding layer 330 in the present embodiment can also be served as a storage capacitor of the pixel structure 300 due to the conductivity thereof and the overlapping area between the conductive light-shielding layer 330 and the pixel electrode 380. Thereby, the conventional design having a common electrode as the storage capacitor is replaced, and the aperture ratio of the pixel structure 300 in the present embodiment is improved.

As described above, the pixel structure 300 in the present embodiment adopts the same concept as the pixel structure 200. However, different layers in these two pixel structures are formed in different sequences. Thus, the pixel structure 300 has the advantages of the pixel structure 200 therefore will not be described herein.

It should be mentioned that besides being disposed at the periphery of the pixel region 312, the conductive light-shielding layer 330 of the pixel structure 300 may also be disposed within the pixel region 312. The overlapping area between the conductive light-shielding layer 330 within the pixel region 312 and the pixel electrode 380 also constitutes a storage capacitor C1 such that the storage capacitance of the pixel structure 300 is further improved. It should be noted that the size of the conductive light-shielding layer 330 within the pixel region 312 will affect the aperture ratio of the pixel structure 300. Thus, the area of the conductive light-shielding layer 330 within the pixel region 312 should be determined according to the actual design requirement. However, this is only an example to show that the conductive light-shielding layer 330 may be implemented in other ways but not intended to limit the present invention.

In addition, the pixel structure 300 in the present embodiment may further include a capping layer 410 and a buffer layer 420. The capping layer 410 is disposed on the color filter layer 320, and the buffer layer 420 is disposed on the capping layer 410, as shown in FIG. 7.

Moreover, because the pixel structure 300 is formed by simply adjusting the sequence in which the conductive light-shielding layer 230a and the pixel electrode 280 are formed in the pixel structure 200, only those different steps in the manufacturing method of the pixel structure 300 will be described.

After the steps illustrated in FIG. 6B are completed, the buffer layer 340 is formed to cover the active devices 370, and the conductive light-shielding layer 330 is formed at the peripheries of the pixel regions 312 on the buffer layer 340. After that, the planarization layer 392 is formed to cover the conductive light-shielding layer 330, and a plurality of pixel electrodes 380 is formed on the planarization layer 392 and above the color filter layer 320, wherein each of the pixel electrodes 380 is electrically connected to one of the active devices 370, and an overlapping area between each of the pixel electrodes 380 and the conductive light-shielding layer 330 constitutes a storage capacitor C1. Herein the pixel structure 300 illustrated in FIG. 7 is completed, and the techniques and materials for forming the color filter layer 320, the scan lines 350, the data lines 360, the active devices 370, the buffer layer 340, the conductive light-shielding layer 330, the planarization layer 392, and the pixel electrodes 380 can be referred to foregoing description therefore will not be described herein.

It should be mentioned that the pixel structure 300 may also adopt the designs illustrated in FIG. 4A and FIG. 4B to achieve an optimal viewing angle when the pixel structure 300 is applied to a display panel.

In summary, the pixel structure and the method for manufacturing the pixel array provided by the present invention have at least following advantages. A conductive light-shielding layer is disposed at the periphery of a pixel region, and an overlapping area between the pixel electrode and the conductive light-shielding layer constitutes a storage capacitor of the pixel structure. Thus, besides being served as a black matrix as in the conventional display technique, the conductive light-shielding layer can also be served as a storage capacitor by being partially overlapped with the pixel electrode. In other words, the conventional design having a common electrode as a storage capacitor is replaced, and the aperture ratio of the pixel structure is improved.

Moreover, if the pixel structure in the present invention still adopts the conventional design having a common electrode as a storage capacitor, since the conductive light-shielding layer and the pixel electrode form a storage capacitor, the pixel structure in the present invention has a greater storage capacitance, and accordingly a better electrical performance, compared to a conventional pixel structure. Furthermore, a method for manufacturing the pixel structure and the pixel array is also provided in the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
a substrate, having a pixel region;
a color filter layer, disposed corresponding to the pixel region of the substrate;
a conductive light-shielding layer, disposed corresponding to a periphery of the pixel region;
a buffer layer, covering the conductive light-shielding layer and the color filter layer;
a scan line and a data line, disposed above the buffer layer;
an active device, disposed above the buffer layer and electrically connected to the scan line and the data line; and
a pixel electrode, disposed above the buffer layer and electrically connected to the active device, wherein an overlapping area between the pixel electrode and the conductive light-shielding layer constitutes a storage capacitor.

2. The pixel structure according to claim 1, wherein the active device and the conductive light-shielding layer at least partially overlap each other.

3. The pixel structure according to claim 1 further comprising a passivation layer covering the active device and the buffer layer, wherein the passivation layer and the buffer layer between the pixel electrode and the conductive light-shielding layer are served as a capacitor dielectric layer of the storage capacitor.

4. The pixel structure according to claim 1, wherein the color filter layer is disposed above the substrate, and the conductive light-shielding layer is disposed above the color filter layer.

5. The pixel structure according to claim 4 further comprising a planarization layer disposed between the color filter layer and the conductive light-shielding layer.

6. The pixel structure according to claim 1 further comprising:
an insulation layer, covering the pixel electrode; and
a common electrode pattern layer, disposed on the insulation layer.

7. A method for manufacturing a pixel array, comprising:
providing a substrate, wherein the substrate has a plurality of pixel regions;
forming a color filter layer above the substrate, wherein the color filter layer is corresponding to the pixel regions;
forming a conductive light-shielding layer at peripheries of the pixel regions above the substrate;
forming a buffer layer above the substrate to cover the conductive light-shielding layer and the color filter layer;
forming a plurality of scan lines, a plurality of data lines, and a plurality of active devices electrically connected to the scan lines and the data lines above the buffer layer;
forming a plurality of pixel electrodes above the buffer layer, wherein each of the pixel electrodes is electrically connected to one of the active devices, and an overlapping area between each of the pixel electrodes and the conductive light-shielding layer constitutes a storage capacitor.

8. The manufacturing method according to claim 7, wherein in the step of forming the color filter layer above the substrate, an alignment pattern is further formed at a periphery of the substrate.

9. The manufacturing method according to claim 8, wherein the step of forming the conductive light-shielding layer above the substrate comprises:
depositing a conductive layer above the substrate by using a shadow mask, wherein the conductive layer exposes the alignment pattern; and
performing a patterning process on the conductive layer to form the conductive light-shielding layer.

10. The manufacturing method according to claim 7, wherein before the step of forming the pixel electrodes, a passivation layer is further formed to cover the active device and the buffer layer, wherein the passivation layer and the buffer layer between the pixel electrode and the conductive light-shielding layer are served as a capacitor dielectric layer of the storage capacitor.

11. The manufacturing method according to claim 7 further comprising forming a planarization layer to cover the color filter layer.

12. The manufacturing method according to claim 7, wherein after the step of forming the pixel electrodes, the manufacturing method further comprises:
forming an insulation layer to cover the pixel electrodes; and
forming a common electrode pattern layer on the insulation layer above each of the pixel electrodes.

* * * * *